United States Patent
Skillman et al.

(10) Patent No.: US 9,372,092 B2
(45) Date of Patent: Jun. 21, 2016

(54) METHOD AND APPARATUS FOR PROVIDING A CONTEXTUAL MENU IN A MAP DISPLAY

(71) Applicant: HERE GLOBAL B.V., Veldhoven (NL)

(72) Inventors: Peter Skillman, Veldhoven (NL); Kevin Coffey, Veldhoven (NL); Nicola Plaisant, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/455,295

(22) Filed: Aug. 8, 2014

(65) Prior Publication Data

US 2016/0040996 A1    Feb. 11, 2016

(51) Int. Cl.
*G01C 21/00* (2006.01)
*G01C 21/36* (2006.01)
*G06F 17/30* (2006.01)
*H04M 1/725* (2006.01)

(52) U.S. Cl.
CPC ...... *G01C 21/3605* (2013.01); *G06F 17/30241* (2013.01); *H04M 1/72569* (2013.01)

(58) Field of Classification Search
CPC ......... G06F 17/30241; G06F 17/3087; H04M 1/72569
USPC .......................... 701/409, 410, 424–426, 533
See application file for complete search history.

(56) References Cited

U.S. PATENT DOCUMENTS

| | | | |
|---|---|---|---|
| 6,633,315 B1 | 10/2003 | Sobeski et al. | |
| 2003/0046087 A1 | 3/2003 | Johnston et al. | |
| 2005/0107925 A1 | 5/2005 | Enigk et al. | |
| 2011/0022393 A1 | 1/2011 | Waller et al. | |
| 2012/0001843 A1 | 1/2012 | Gravino | |
| 2012/0158472 A1* | 6/2012 | Singh et al. | 705/14.4 |

(Continued)

FOREIGN PATENT DOCUMENTS

| | | |
|---|---|---|
| EP | 1 061 340 A2 | 12/2000 |
| EP | 2244061 A1 | 10/2010 |
| WO | 2014/107513 A2 | 7/2014 |

OTHER PUBLICATIONS

Kranz et al., "Open Vehicular Data Interfaces for In-Car Context Inference", AutomotiveUI 2009, Proceedings of the First International Conference on Automotive User Interfaces and Interactive Vehicular Applications, Essen, Germany, Sep. 21-22, 2009, pp. 57-62.

(Continued)

*Primary Examiner* — Gertrude Arthur Jeanglaud
(74) *Attorney, Agent, or Firm* — Ditthavong & Steiner, P.C.

(57) ABSTRACT

An approach is provided for presenting a contextual menu in a map display. A contextual menu platform determines an input for a delineation of at least one route, at least one geographical area, or a combination thereof in at least one map user interface of at least one device. The contextual menu platform determines contextual information associated with the at least one route, the at least one geographical area, the at least one map user interface, the at least one device, at least one user associated with the at least one device, or a combination thereof. The contextual menu platform also determines one or more contextual menu options based, at least in part, on the contextual information. The contextual menu platform further causes, at least in part, a presentation of at least one contextual menu to present the one or more contextual menu options in the at least one map user interface.

20 Claims, 16 Drawing Sheets

(56) References Cited

U.S. PATENT DOCUMENTS

2012/0232787 A1* 9/2012 Kunath et al. ................ 701/423
2013/0311916 A1 11/2013 Weng et al.

OTHER PUBLICATIONS

Office Action for corresponding European Patent Application No. 15177626.7-1557, dated Dec. 11, 2015, 7 Pages.

* cited by examiner

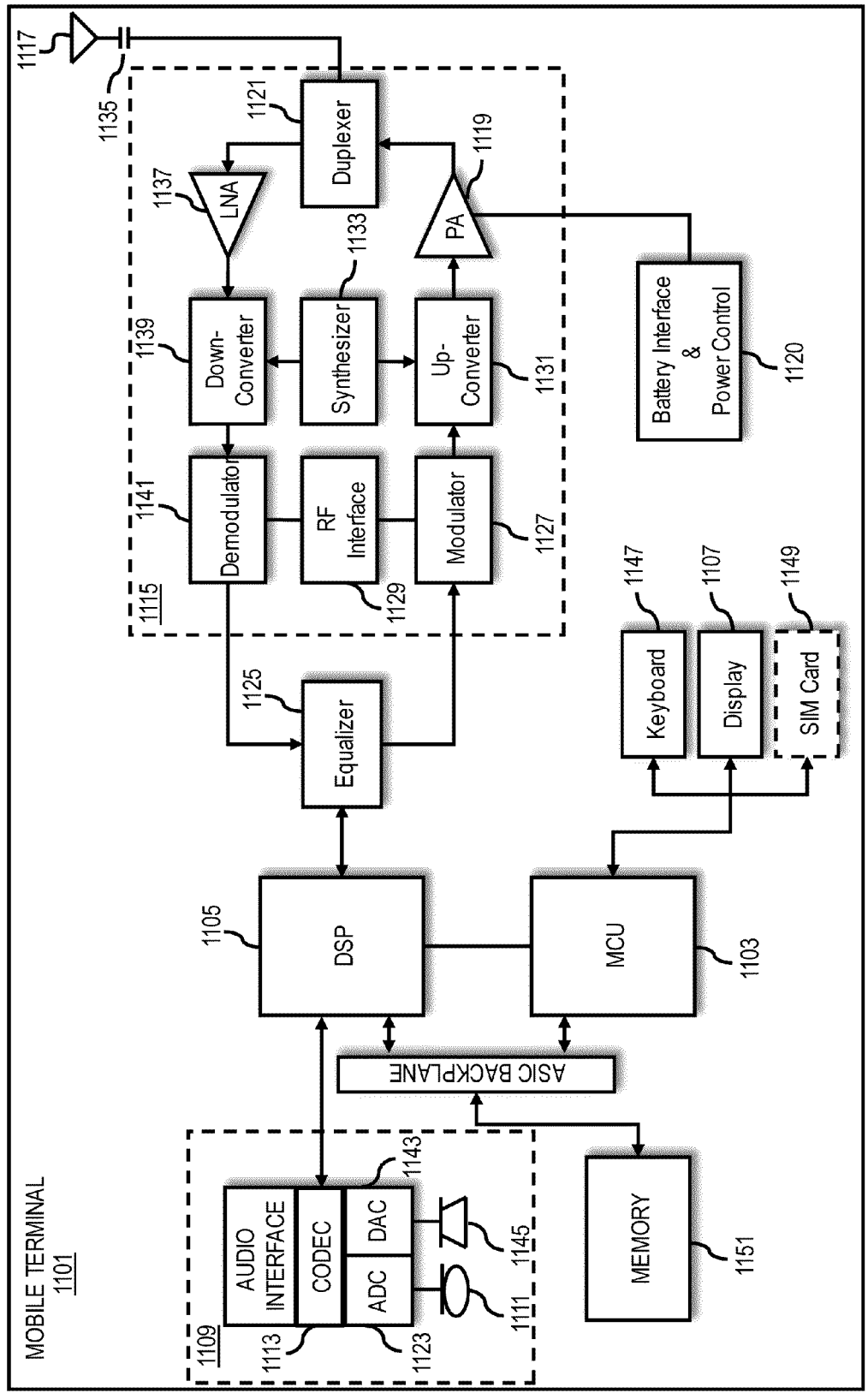

METHOD AND APPARATUS FOR PROVIDING A CONTEXTUAL MENU IN A MAP DISPLAY

BACKGROUND

Service providers and device manufacturers (e.g., wireless, cellular, etc.) are continually challenged to deliver value and convenience to consumers by, for example, providing compelling network services. One area of development has been in the area of mapping and navigation applications and services, where rapid advancements have resulted in a proliferation of functions and options available to end users. However, this increased number of map related functions and options may also make it more difficult for users to discover or access them. Accordingly, service providers and device manufacturers face significant technical challenges to exposing potentially relevant functions and options, particularly when a user interacts with a map display.

SOME EXAMPLE EMBODIMENTS

Therefore, there is a need for an approach for providing a contextual menu in a map display that can expose relevant functions and/or menu options in the map display based on a route, and/or geographical area indicated or otherwise selected by a user.

According to one embodiment, a method comprises determining an input for a delineation of at least one route, at least one geographical area, or a combination thereof in at least one map user interface of at least one device. The method also comprises determining contextual information associated with the at least one route, the at least one geographical area, the at least one map user interface, the at least one device, at least one user associated with the at least one device, or a combination thereof. The method further comprises determining one or more contextual menu options based, at least in part, on the contextual information. The method further comprises causing, at least in part, a presentation of at least one contextual menu of the one or more contextual menu options in the at least one map user interface.

According to another embodiment, an apparatus comprises at least one processor, and at least one memory including computer program code for one or more computer programs, the at least one memory and the computer program code configured to, with the at least one processor, cause, at least in part, the apparatus to determine an input for a delineation of at least one route, at least one geographical area, or a combination thereof in at least one map user interface of at least one device. The apparatus is also caused to determine contextual information associated with the at least one route, the at least one geographical area, the at least one map user interface, the at least one device, at least one user associated with the at least one device, or a combination thereof. The apparatus is further caused to determine one or more contextual menu options based, at least in part, on the contextual information. The apparatus is further caused to cause, at least in part, a presentation of at least one contextual menu of the one or more contextual menu options in the at least one map user interface.

According to another embodiment, a computer-readable storage medium carries one or more sequences of one or more instructions which, when executed by one or more processors, cause, at least in part, an apparatus to determine an input for a delineation of at least one route, at least one geographical area, or a combination thereof in at least one map user interface of at least one device. The apparatus is also caused to determine contextual information associated with the at least one route, the at least one geographical area, the at least one map user interface, the at least one device, at least one user associated with the at least one device, or a combination thereof. The apparatus is further caused to determine one or more contextual menu options based, at least in part, on the contextual information. The apparatus is further caused to cause, at least in part, a presentation of at least one contextual menu of the one or more contextual menu options in the at least one map user interface.

According to another embodiment, an apparatus comprises means for determining an input for a delineation of at least one route, at least one geographical area, or a combination thereof in at least one map user interface of at least one device. The apparatus also comprises means for determining contextual information associated with the at least one route, the at least one geographical area, the at least one map user interface, the at least one device, at least one user associated with the at least one device, or a combination thereof. The apparatus further comprises means for determining one or more contextual menu options based, at least in part, on the contextual information. The apparatus further comprises means for causing, at least in part, a presentation of at least one contextual menu of the one or more contextual menu options in the at least one map user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 11 is a diagram of a mobile terminal (e.g., handset) that can be used to implement an embodiment of the invention.

DESCRIPTION OF SOME EMBODIMENTS

Examples of a method, apparatus, and computer program for providing a contextual menu in a map display are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. For example, systems and/or methods described herein may include more, less, or different components and/or steps and order arrangement may be modified. In other instances, well-known structures and devices are shown in block diagram form in order to avoid unnecessarily obscuring the embodiments of the invention.

Figure 1A:
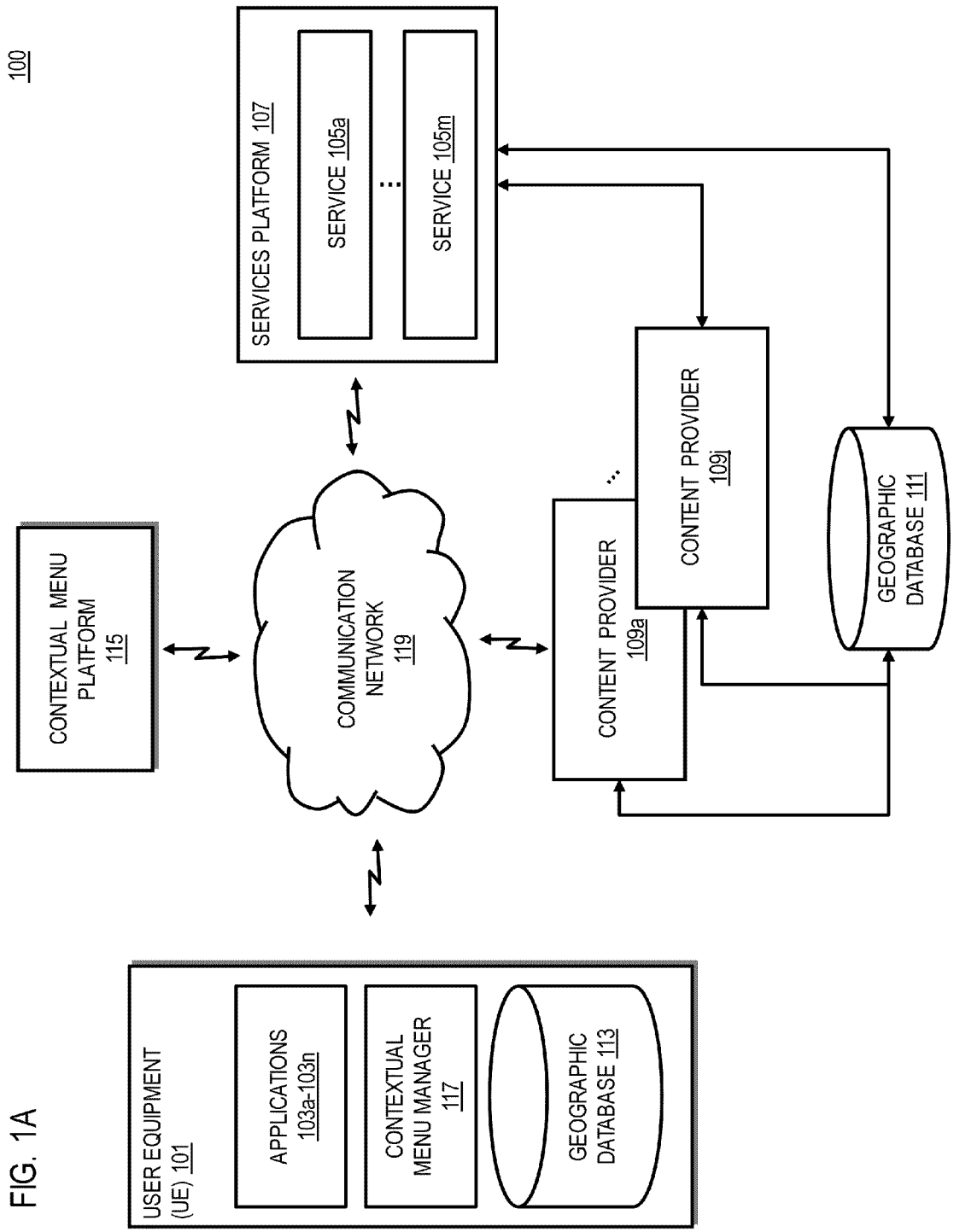
FIG. 1A is a diagram of a system capable of providing a contextual menu in a map display, according to one embodiment.

FIG. 1A is a diagram of a system capable of providing a contextual menu in a map display, according to one embodiment. As noted above, the growing number of functions and options available to users of mapping and/or navigation related applications and services can make discovery and access to those functions and options a significant burden to end users. For example, users may have to learn potentially complex commands and/or menu structures to access their functions or options of choice, thereby potentially creating a difficult user experience. As a result, application and service developers traditionally have had to make compromises between offering more functionality against maintaining a more streamlined user interface and user experience. This balance between functionality and usability can be particularly challenging for mapping related applications and services, where the number of available functions can quickly overwhelm a user just as the user is engaged in potentially complex and mentally-taxing tasks (e.g., reading maps, navigating in unknown environments, operating vehicles, conducting searches, etc.). This potential complexity or burden may discourage many users from taking advantage of all but the most basic functions of mapping applications and services.

To address this challenge, a system 100 of FIG. 1A introduces a capability to provide a contextual menu in a map display or user interface based on a route, a geographical area, or a combination thereof delineated by a user in the map display or user interface. In one embodiment, the route and/or geographical area can be delineated using any input modality supported by at least one user equipment (UE) 101 (e.g., a mobile phone, or an embedded device such as a car head unit, personal navigation device, etc.) operating in the system 100. In one embodiment, delineating an area also include selecting map objects or features included within or proximate to the delineated area or route. In this way, the map objects or features can also be used to determine contextual information for generating the contextual menu. By way of example, an input modality can include any combination of a drawing input modality, a gesture input modality, a voice input modality, a gaze tracking input modality, a text input modality, and the like. It is noted that the example input modalities discussed herein are provided as examples and not as limitations to the various embodiments described herein.

In other words, in one embodiment (e.g., using a drawing input modality), a user can draw a route or a boundary surrounding a geographical area in a map user interface of one or more applications 103a-103n (also collectively referred to as applications 103) executing on the UE 101 to specify the route or geographical area as input for generating a contextual menu. In one embodiment, the applications 103 may include, at least in part, (1) native mapping/navigation applications or services; (2) client applications to one or more mapping/navigation services (e.g., services 105a-105m—also collectively referred to as services 105—provided by a services platform 107); (3) client applications to one or more mapping content providers 109a-109j (also collectively referred to as content providers 109); (4) a browser application configured to access one or more mapping web portals to the services 105 and/or the content providers 109; or any combination thereof.

In one embodiment, the services 105 provide service functions and/or content using information or data stored in one or more databases (e.g., a geographic database 111). In one embodiment, the UE 101 and/or the application 103 may download and/or cache all or a portion of the geographic database 111 as a local geographic database 113 to provide mapping and/or related data for generating a contextual menu.

In one embodiment, the geographic databases 111 and/or 113 are maintained by the content providers 109. By way of example, a content provider 109 can be a map content provider that provides mapping and location information in the form of the geographic database 111. Moreover, the content providers 109 maintain the geographic database 111 as a server side component that is kept up-to-date.

In yet another embodiment, the service 105 may include services other than mapping/navigation services (e.g., social networking services, reservation services, content sharing services, etc.) that can provide functions and/or menu options for incorporation into a contextual menu as generated according to the various embodiments described herein.

As described above, in one embodiment, the UE 101 is a client of at least one of the services 105 (e.g., a location-based service such as a mapping or navigation service) that depends on the information from the server side geographic database 111. Accordingly, the UE 101 includes a version of all or a portion of geographic database 111 that is stored locally at the UE 101 as the geographic database 113. By way of example, the UE 101 can execute one or more applications 103 (e.g., client applications of the services 105) to access the locally stored geographic database 113.

In one embodiment, the system 100 includes a contextual menu platform 115 (e.g., a network side component) and/or a contextual menu manager 117 (e.g., a client side or a stand-alone component of the UE 101) for processing the input delineating the route or geographical area to generate and present the contextual menu in the map display or user interface. It is contemplated that the contextual menu platform 115 and the contextual menu manager 117 can operate in a cooperative mode (e.g., via a client-server relationship) over a communication network 119 or in an independent mode to provide all or a portion of the contextual menu functions of the various embodiments described herein. In addition, the contextual menu manager 117 may be a separate component of the UE 101 or a sub-component/module of any of the applications 103 executing on the UE 101.

In one embodiment, the system 100 (e.g., via the contextual menu platform 115 and/or the contextual menu manager 117) determines contextual information associated with the route and/or geographical area delineated by the user to determine one or more menu options to include in a contextual menu. By way of example, contextual information about a route or geographical area may include, but is not limited to, neighborhood information, weather information, proximity, type of area, demographics, distance, available points of interest, etc.

In another embodiment, the system 100 may determine contextual information associated with the UE 101 presenting map display (e.g., activity at the device, speed of the device, movement of the device, sensed mode of transport, location of the device, other sensor information, prior search history, etc.). In addition, the system 100 may determine contextual information about one or more users of the UE 101 (e.g., user profile information, user preference information, historical use information, etc.). It is contemplated that the system 100 can gather or query for any other type of contextual information associated with any component or module of the system 100 (e.g., other devices operating in the system 100, the applications 103, services 105, content providers 109, etc.). This contextual information is then used to determine what menu options and/or functions to expose to a user in the contextual menu.

In one embodiment, the system 100 may determine contextual information and/or contextual menu options to present based on characteristics associated with the input modality used for delineating the route or geographical area. For example, the system 100 may determine the speed of input, a line thickness when drawing the route or geographical area (e.g., as measured by input pressure sensors), a shape used in delineating the route or geographic, and the like as input characteristics. The system 100 may configure a contextual menu or contextual menu options differently based on the determined input characteristics. By way of example, the correlation between input characteristics and resulting contextual menu options can be configured by input from service provider, learned through data analytics, input from a user, etc.

In one embodiment, the system 100 may further parse the input for delineating a route or geographic for other related information. The input, for instance, may encode other information such as a directional input or a vector heading input by the user. By way of example, instead of or in addition to delineating (e.g., drawing) a route or geographical area, a user may (e.g., via the mapping user interface) draw or use a flick gesture to indicate a direction with respect to the map display. The system 100 can then calculate or infer (e.g., based on preset rules or data) an intended route or geographical area associated with the direction. In another example, the user may indicate a vector heading (e.g., direction plus speed) via a similar input as described for the directional input with the addition of, for instance, correlating a speed of the drawing or executing of the flick gesture with a speed value for the vector. Similarly, the system 100 can calculate or infer a delineation of a route or geographical area based on the vector input.

In another embodiment, the user can provide a simple or abbreviated input (e.g., a tapping input on an area or point in the map user interface). The system 100 can then calculate or infer a delineated route or geographical area associated with the tap based one or more preset rules, user preferences, user configuration, service provider configuration, etc. For example, the user may specify that in response to a tap on the screen, the system 100 should interpret the tap as an input for delineating a geographic defined by a preconfigured radius from the tap location. It is noted that although various embodiments are discussed with a tapping input as an example of a simple or abbreviated, it is contemplated that this type of input can take any form and be configured or provided using any input modality.

In one embodiment, the system 100 can interpret the input as a literal delineation of the route or geographical area. For example, if a line or boundary is traced as a drawing input over the map user interface, the actual line or boundary is used to delineate the route or geographical area for generating a contextual menu. In addition or alternatively, the system 100 may be configured to correlate or fit the input line or boundary to map features (e.g., by snapping drawn lines to roads, paths, building boundaries, etc.). In other words, system 100 can transform an input delineation so that it conforms to natural boundaries or features present in the mapping data underlying the map user interface. In yet another embodiment, the system 100 can transform the delineation input so to normalize the shapes into reference geometric shapes (e.g., squares, circles, triangles, etc.) that best approximates the user's actual input. It is contemplated that the system 100 can be configured to apply any form of transformation to user delineation inputs to select a route and/or geographical area for generating a contextual menu.

In one embodiment, in addition to determining the contextual menu options to present based contextual information associated with a delineated route or geographical area, the system 100 can process the contextual information to configure one or more parameters for the menu options or functions. By way of example, the proposed or calculated parameters can be presented as default values for the options in the contextual menu that can be confirmed or modified by the user. For example, if one contextual menu is for sharing a location, the system 100 can process contextual information to determine a closest one of the user's friends and then configure the sharing option with the friend's contact information. It is contemplated that the user configure the system 100 to determine parameters for all contextual menu options, for a select set of menu options, or for no options at all.

By way of example, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, car head unit, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, applications 103, services 105, content providers 109, contextual menu platform 115, contextual menu manager 117 communicate with each other and other components of the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the applications 103 and the services 105; and the contextual menu manager 117 and the contextual menu platform 115 can interact according to a client-server model. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 1B:
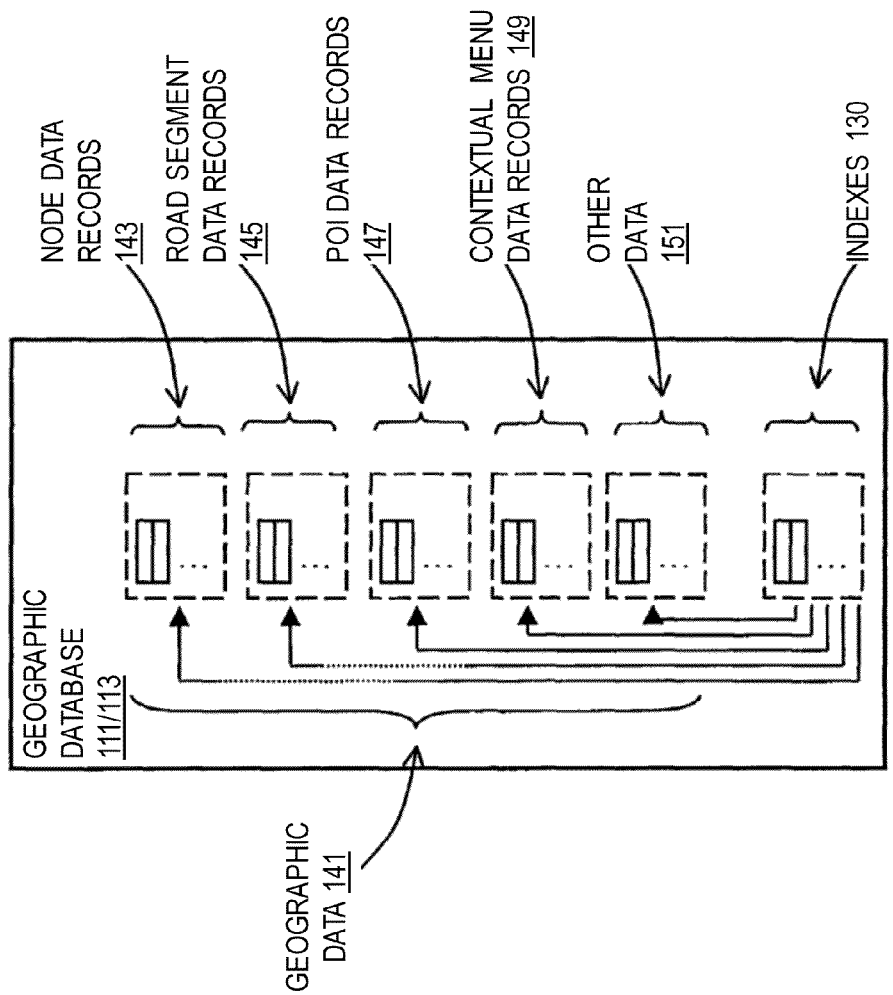
FIG. 1B is a diagram of a geographic database, such as can be included in the system of FIG. 1A, according to one embodiment.

FIG. 1B is a diagram of geographic databases 111 and 113 of system 100, according to one embodiment. In the presented embodiments, mapping data and related contextual menu data can be stored, associated with, and/or linked to the geographic databases 111 and 113. In one embodiment, the geographic database 111/113 includes geographic data 141 used for (or configured to be compiled to be used for) mapping and/or navigation-related services 105, such as for personalized route determination, according to exemplary embodiments. For example, the geographic database 111/113 includes node data records 143, road segment or link data records 145, POI data records 147, contextual menu data records 149, and other data records 151. More, fewer or different data records can be provided.

In one embodiment, the contextual menu data records 149 can be used to associate a particular contextual menu option with a given map feature at any specified level of granularity. For example, for map features defined at a neighborhood level, contextual menu options relevant to an entire neighborhood may be stored in the contextual menu data records 149. As noted, it is contemplated that map features and associated contextual menu options can be defined at any scale from an individual building (or smaller features) to cities, countries, continents, etc. In addition, although the contextual menu data records 149 are described as part of the geographic database 111/113, it is contemplated that the contextual menu data records 149 may be stored in another database or component of the system 100 (e.g., in the contextual menu platform 115 and/or the contextual menu manager 117).

In one embodiment, the other data records 151 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 145 are links or segments representing roads, streets, or paths, as can be used in the calculated route or recorded route information for determination of one or more personalized routes, according to exemplary embodiments. The node data records 143 are end points corresponding to the respective links or segments of the road segment data records 145. The road link data records 145 and the node data records 143 represent a road network, such as used by vehicles, cars, and/or other entities. Alternatively, the geographic database 111/113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111/113 can include data about the POIs and their respective locations in the POI data records 147. The geographic database 111/113 can also include data about places, such as cities, towns, or other communities, and other geographic features, such as bodies of water, mountain ranges, etc. Such place or feature data can be part of the POI data 147 or can be associated with POIs or POI data records 147 (such as a data point used for displaying or representing a position of a city). In addition, the geographic database 111/113 can include event data (e.g., traffic incidents, constructions, scheduled events, unscheduled events, etc.) associated with the POI data records 147 or other records of the geographic database 111/113.

The geographic database 111/113 can be maintained by the content provider 109 (e.g., a map developer) in association with the services platform 107. By way of example, the map developer can collect geographic data to generate and enhance the geographic database 111/113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111/113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database 111 can be a master geographic database, but in alternate embodiments, the client side geographic database 113 can represent a compiled navigation database that can be used in or with end user devices (e.g., UEs 101) to provide navigation and/or map-related functions. For example, the geographic database 113 can be used with the end user device 101 to provide an end user with navigation features. In such a case, the geographic database 113 can be downloaded or stored on the end user device UE 101, such as in applications 103, or the end user device UE 101 can access the geographic database 111 and/or 113 through a wireless or wired connection (such as via a server and/or the communication network 119), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation and map functions such as guidance and map display, for example, and for determination of one or more personalized routes or route segments based on one or more calculated and recorded routes, according to exemplary embodiments.

Figure 2:
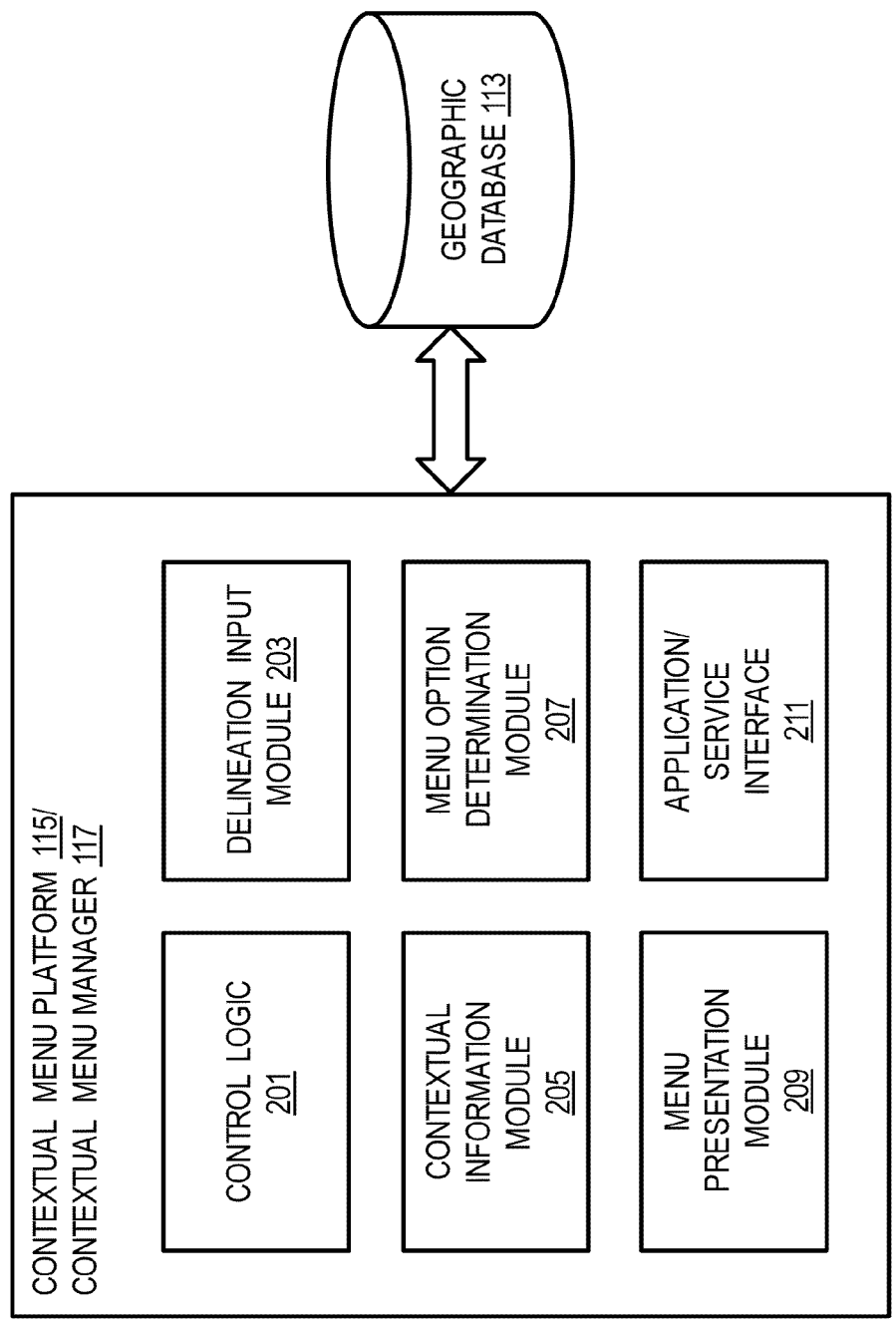
FIG. 2 is a diagram of components of a contextual menu platform/contextual menu manager, according to one embodiment.

FIG. 2 is a diagram of components of a contextual menu platform/contextual menu manager, according to one embodiment. By way of example, the contextual menu platform 115 and the contextual menu manager 117 include one or more components for providing a contextual menu in a map display according to the approaches of the various embodiments described herein. It is contemplated that the functions of these components may be combined in one or more components or performed by other components of equivalent functionality. In one embodiment, the contextual menu platform 115 and/or the contextual menu manager 117 include a control logic 201, a delineation input module 203, a contextual information module 205, a menu option determination module 207, a menu presentation module 209, and an application/service interface 211.

In one embodiment, the control logic 201 executes at least one algorithm for executing one or more functions of the contextual menu platform 115 and/or the contextual menu manager 117. For example, the control logic 201 interacts with the delineation input module 203 to determine an input from a user for delineating a route or a geographical area to trigger a generating of a contextual menu. In one embodiment, the delineation input module 203 enables the user to provide a free-form input means (e.g., in any available input modality) to delineate (e.g., draw, trace, outline, etc.) a route or geographical area in a map display or user interface. In one embodiment, the delineation input module 203 includes or provides interfaces to input/output circuitry, sensors, devices, etc. to receive delineation input data according to one or more input modalities (e.g., a drawing input modality, a gesture input modality, a voice input modality, a gaze tracking input modality, a text input modality, etc.).

By way of example, the types of input/output circuitry, sensors, devices, etc. supported by the delineation input module 203 is configurable based on the input modalities to be supported by a UE 101 providing the delineation input data. For example, if a drawing input modality is to be supported, the delineation input module 203 can be configured to support a collection and processing of touch screen input data, stylus input data, and the like. As another example, if voice input data is to be supported, the delineation input module 203 can be configured to support a collection and a processing of audio sampling data. Other input modalities can be similarly configured.

In one embodiment, the processing functions configured in the delineation input module 203 can include algorithms or other modules for parsing information from the collected raw data (e.g., algorithms for recognized drawn lines and/or shapes, algorithms for correlating detected eye movements to physical locations on a map display for gaze tracking, algorithms for converting speech-to-text to interpret delineation input data provided in spoken form, etc.).

In one embodiment, the delineation input module 203 collects and processes raw input data to determine or calculate a route or a geographical area that is delineated (e.g., drawn or otherwise indicated via an input modality) by a user. In one embodiment, the delineation input module 203 module also includes algorithms and/or logic for determining the characteristics of the delineation input data. In another embodiment, the delineation input module 203 includes algorithms and/or logic for inferring a delineated route or geographic from a simple or abbreviated input, normalizing delineation inputs to reference shapes, correlating delineation input data to map features, and/or other processing steps associated with collecting and/or processing delineation input data. In yet another embodiment, the delineation input module 203 also selects the map objects or features within or proximate to the delineated area or route. Accordingly, the selected map objects or features comprise at least a portion of the input used for determining relevant contextual information and/or generating the contextual menu. In one embodiment, the delineation input module 203 can be configured with one or more parameters, criteria, threshold values, etc. for classifying whether map objects or features are within or proximate to the delineated area or route.

In one embodiment, the delineation input module 203 then passes the delineated route or geographical area to the contextual information module 205 for further processing. In one embodiment, the contextual information module 205 can construct a location-based query using the delineated route and/or geographical area to retrieve or otherwise determine potentially relevant contextual information. By way of example, the contextual information module 205 can retrieve contextual information from the UE 101, the applications 103, the services 105, the content providers 109, and/or any other source of contextual information available via the system 100, including the geographic databases 111 and 113. In addition, the contextual information can be related to the device itself, the input data, the input modality, a user of the device, an application 103 providing the map display, the service 105, the content provider 109, and/or any other entity, process, device, component, input, data, etc. associated with or related to the generating of the contextual menu and/or determination of the contextual menu options.

For example, in one embodiment, the contextual information module 205 may determine a context of a device 101 or application 103 providing a map display based on user input or user activity at the device 101 or the application 103. In one embodiment, the contextual information module 205 may query the application 103 to determine an activity state or current functions executing at a device (e.g., whether navigation is active, whether a search has been conducted, a mode of travel currently associated with the device—e.g., driving, walking, biking, etc., a speed the device is travelling, and the like).

The contextual information module 205 then interacts with, for instance, the menu option determination module 207 to select potentially relevant functions and/or menu options to present in a contextual menu of a map display. In one embodiment, the contextual information determined by the contextual information module 205 is used to determine specific contexts associated with a given UE 101 and/or application 103. The menu option determination module 207 can then, for instance, query for menu options associated with the determined contexts to generate the contextual menu. In one embodiment, the associations between contexts and contextual menu options can be defined by a service provider or a user. In addition or alternatively, the associations between contexts and contextual menus options can be modeled or determined through machine learning techniques. It is contemplated that the menu option determination module 207 can employ any means for associating or selecting menu options with contextual information or contexts associated with a delineated route or geographical area.

In one embodiment, the menu option determination module 207 can also query the services 105 and/or content providers 109 using, for instance, the application/service interface 211. By way of example, the application/service interface 211 can be an application programming interface (API), a function library, etc. to support access to and/or integration with one or more relevant functions of the services 105 and/or content providers 109. By way of example, potentially relevant functions or menu options include, but are not limited to, performing a search, exploring a route/area, retrieving transit information, sharing a location or route, collecting a route or geographical area, publishing a route or geographical area, initiating routing/navigation based on a route or geographical area, viewing social graphs based on a route or geographical area, initiating a meeting based on a route or geographical area, initiating an application or service based on a route or geographical area, etc.

In one embodiment, the menu option determination module 207 can also determine operational parameters for the menu options or functions selected for generating a contextual menu. For example, for a search option, the menu option determination module 207 can recommend search terms based on delineated route or geographical area. Depending on the specific menu option, the menu option determination module 207 can recommend different types of parameters. As previously discussed, the parameters can be provided as default values for editing by the user. In one embodiment, the user can also configure whether the menu option determination module 207 provides recommended or default parameters for the menu options or functions.

After determining the menu options for generating a contextual menu based on a delineated route or geographical area, the menu option determination module 207 interacts with the menu presentation module 209 to present the contextual menu in a map display or user interface. In one embodiment, the menu presentation module 209 can determine a location on the screen associated with the delineated input (e.g., where the user drew a route or area boundary) and present the contextual menu in proximity to the input location. For example, if a radial contextual menu is used, the menu presentation module 209 can arrange the menu options of the contextual menu in radial fashion around the input location. It is contemplated that the menu presentation module 209 can be configured to the present the contextual menu and its constituent menu options at any location in the map user interface using any arrangement.

Figure 3:
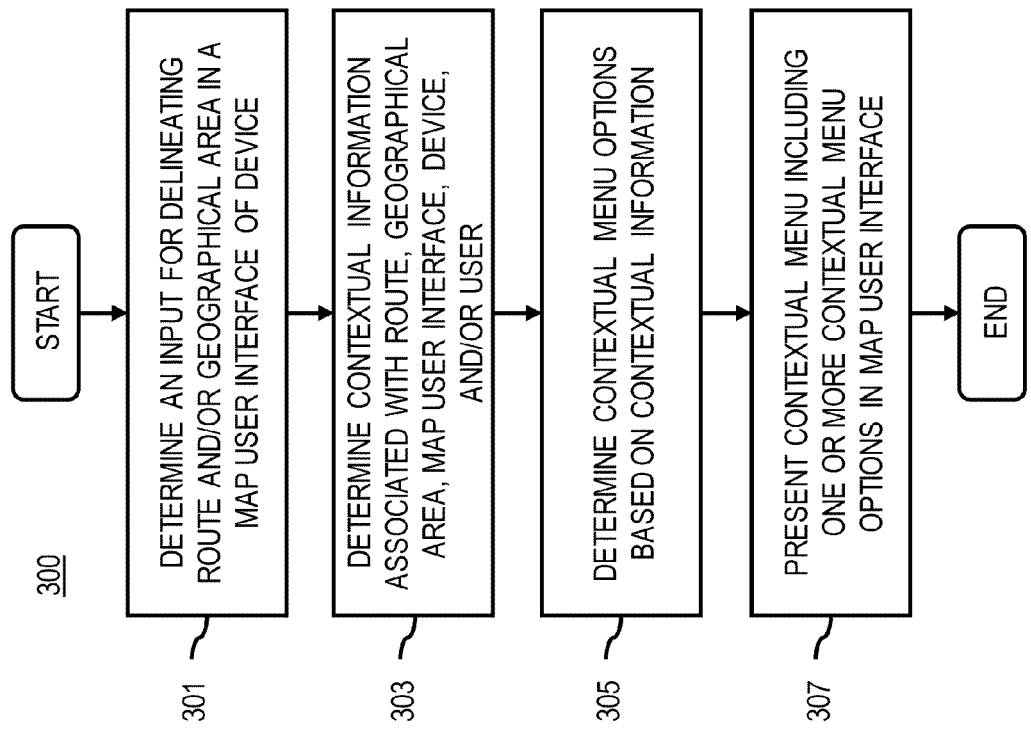
FIG. 3 is a flowchart of a process for providing a contextual menu in a map display based on an input specifying a route or geographical area, according to one embodiment.
Figure 10:
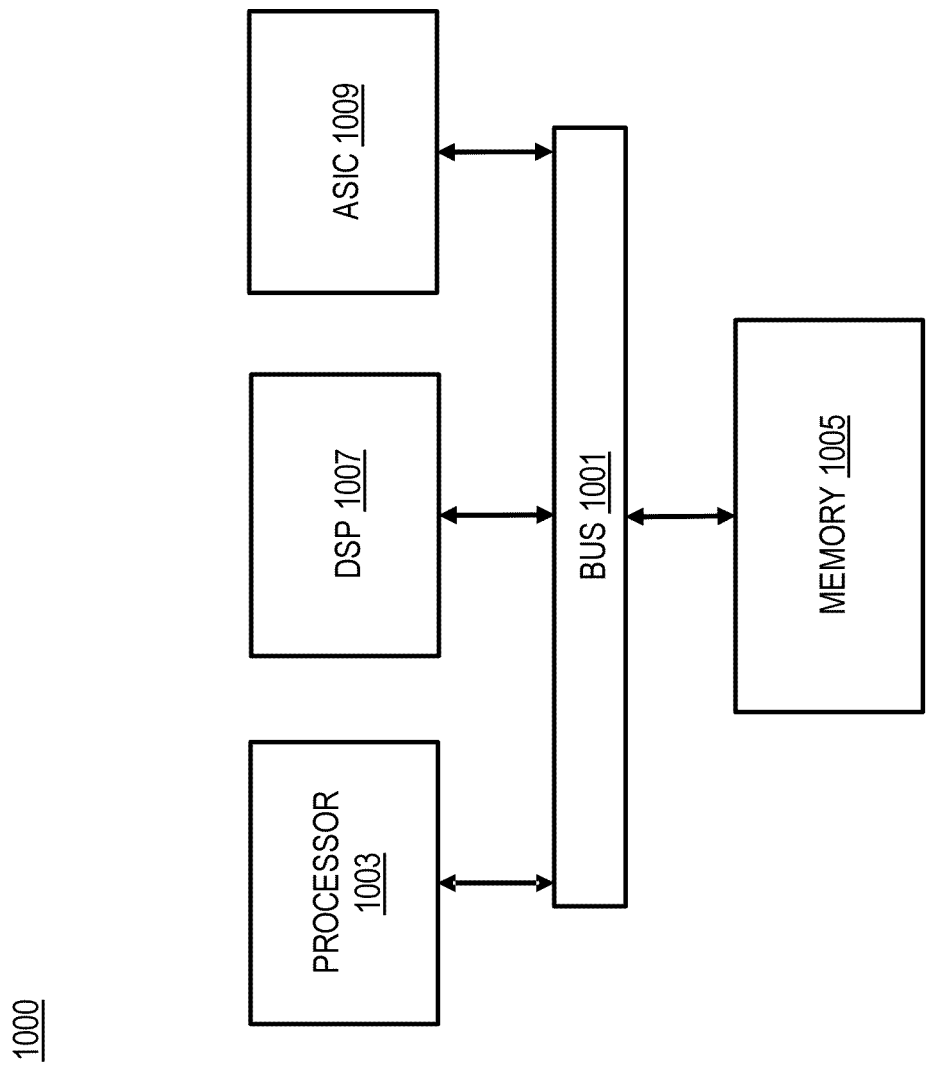
FIG. 10 is a diagram of a chip set that can be used to implement an embodiment of the invention.

FIG. 3 is a flowchart of a process for providing a contextual menu in a map display based on an input specifying a route or geographical area, according to one embodiment. In one embodiment, the contextual menu platform 115 and/or the contextual menu manager 117 perform all or a portion of the process 300 and are implemented in, for instance, a chip set including a processor and a memory as shown in FIG. 10. As such, the contextual menu platform 115 and/or the contextual menu manager 117 can provide means for accomplishing various parts of the process 300 as well as means for accomplishing other processes in conjunction with other components of the system 100.

In step 301, the contextual menu platform 115 determines an input for a delineation at least one route, at least one geographical area, or a combination thereof in at least one map user interface of at least one device. In one embodiment, the delineation of the route and/or geographical area includes tracing or otherwise indicating an outline to specify the route and/or the geographical area. For example, a user can provide a delineation input tracing or indicating an outline of a desired route or geographical area for generating a contextual menu. In one embodiment, the input also includes the map objects or features within or proximate to the delineated area or route.

In one embodiment, the delineation of the at least one route, the at least one geographical area, or a combination thereof is provided using at least one input modality, and wherein the at least one input modality includes, at least in part, a drawing input modality, a gesture input modality, a voice input modality, a gaze tracking input modality, a text input modality, or a combination thereof. In other words, the user can employ any modality supported by a UE 101 for tracing or otherwise indicating an outline of a route or a geographical area.

One example of delineating includes drawing a route or an outline/boundary of a desired area. With respect to other modalities, a voice input to trace or indicate an outline can be provided by spoken word (e.g., "trace a route from point A to point B via highway C"; "delineate a geographical area originating from point A with a circular radius of 100 yards"; etc.). A gaze-tracking input may specify a tracing by following a user's point of focus across a map user interface or display using gaze-tracking sensors or cameras.

In step 303, the contextual menu platform 115 determines contextual information associated with the at least one route, the at least one geographical area, the at least one map user interface, the at least one device, at least one user associated with the at least one device, or a combination thereof. As previously described, the contextual menu platform 115 can gather contextual information by querying contextual databases (e.g., the geographic databases 111 and 113). In addition, the contextual menu platform 115 can request contextual information from a user device 101, applications 103, services 105, content providers 109, etc.

In one embodiment, the input further specifies at least a portion of the contextual information. For example, as the user provides input for delineating a route or geographical area, the user may also specify contextual information that can be used to further refine or determine the contextual menu options that are potentially relevant. In one embodiment, the contextual information may be set by selecting from available contextual options. In some embodiments, contextual information can be indicated or coded as different features of the tracing or outlining used for delineation (e.g., different types of lines—dashed vs. solid lines—used for delineating a route or geographical area; selecting different colors or line widths for tracing a route or geographical area; etc.).

In step 305, the contextual menu platform 115 determines one or more contextual menu options based, at least in part, on the contextual information. As previously described, in one embodiment, the contextual menu platform 115 can process the contextual information to infer or determine a context associated with the delineated route or geographical area. The contextual menu platform 115 can then query for menu options that are associated with the determined context. Examples of different contexts are discussed below with respect to FIGS. 8A-8D.

In step 307, the contextual menu platform 115 causes, at least in part, a presentation at least one contextual menu of the one or more contextual menu options in the at least one map user interface. In one embodiment, the contextual menu platform 115 optionally processes and/or facilitates a processing of the contextual information to determine one or more default parameter values for the one or more contextual menu options. The contextual menu platform 115 can then cause, at least in part, a presentation of the one or more default parameters values in the at least one contextual menu.

Figure 4:
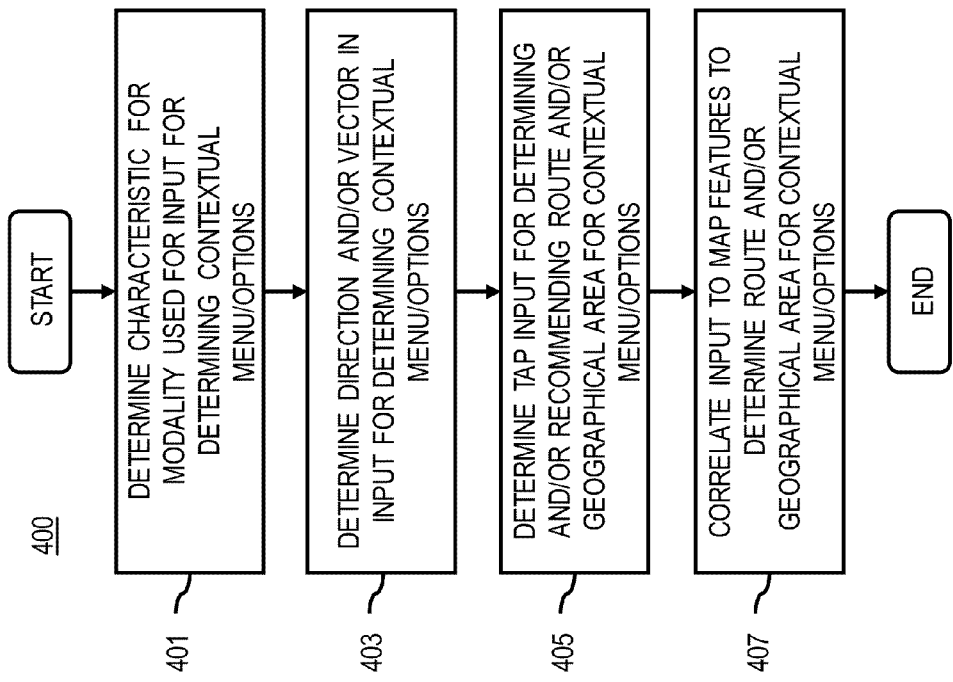
FIG. 4 is a flowchart of a process for providing optional functions associated with providing a contextual menu in a map display, according to one embodiment.

FIG. 4 is a flowchart of a process for providing optional functions associated with providing a contextual menu in a map display, according to one embodiment. In one embodiment, the contextual menu platform 115 and/or the contextual menu manager 117 perform all or a portion of the process 400 and are implemented in, for instance, a chip set including a processor and a memory as shown in FIG. 10. As such, the contextual menu platform 115 and/or the contextual menu manager 117 can provide means for accomplishing various parts of the process 400 as well as means for accomplishing other processes in conjunction with other components of the system 100.

The process 400 optional function steps that can be performed in combination with one or more steps of the process 300 of FIG. 3. Although the steps of the process 400 are provided in sequence, it is contemplated that each step can be performed alone or in combination with any of the steps of processes 300 and 400.

Step 401 assumes that an input has been received or otherwise determined delineating a route or geographical area for generating a contextual menu (e.g., as described with respect to step 301 of FIG. 3). In step 401, the contextual menu platform 115 processes and/or facilitates a processing of the input to determine at least one input characteristic associated with the at least one input modality used for the delineation the at least one route, the at least one geographical area, or a combination thereof. In one embodiment, the at least one input characteristic includes, at least in part, an input speed, an input shape, or a combination thereof.

In one embodiment, the contextual information, the one or more contextual menu options, or a combination thereof are further based, at least in part, on the at least one input characteristic. More specifically, it is contemplated that the characteristics, for instance, may be used to infer different associated contexts or to provide additional contextual information for selecting potentially relevant contextual menu options.

In step 403, the contextual menu platform 115 determines that the input specifies at least one direction, at least one vector heading, or a combination thereof. In some cases, a user may additionally or alternatively provide an input for specifying a direction or vector for use in generating a contextual menu. For example, a user can flick (e.g., by performing a press and hold gesture followed by a flick gesture in a desired direction) or draw in a certain direction to select a route or a geographic location in that general direction or vector heading without having to necessarily fully delineate the route or area. In one embodiment, the contextual information, the one or more contextual menu options, or a combination thereof are further based, at least in part, on the at least one direction, the at least one vector heading, or a combination thereof.

In step 405, the input is at least one tap input or other type of simplified or abbreviated input. Similar to the directional or vector-based input of step 403, a tap input enables the user to quickly delineate a route or area without have to fully trace a corresponding outline. In one embodiment, the contextual menu platform 115 can use different characteristics of the tap to make different delineation selections. For example, a light tap might delineate an area with a smaller radius surrounding the tap point, while a heavier or firmer tap might delineate a larger radius. In other embodiments, the contextual menu platform 115 can use contextual information about a user's preferences, profile, intended travel plans, etc. to recommend or infer a route or area to delineate based on the tap. Accordingly, the contextual menu platform 115 processes and/or facilitates a processing of the at least one tap input to initiate a determination, a recommendation, or a combination thereof of the at least one route, the at least one geographical area, or a combination thereof.

In step 407, the contextual menu platform 115 causes, at least in part, a correlation of the input to one or more map features in the at least one map user interface. The contextual menu platform then determines the at least one route, the at least one geographical area, or a combination thereof based, at least in part, on the correlation. For example, the contextual menu platform 115 enables the user to loosely delineate a route or geographical area that can then be automatically redrawn by the contextual menu platform 115 so that the delineate route or geographical aligns with map features (e.g., roads, paths, buildings, points of interest, natural boundaries, terrain, etc.).

Figure 5:
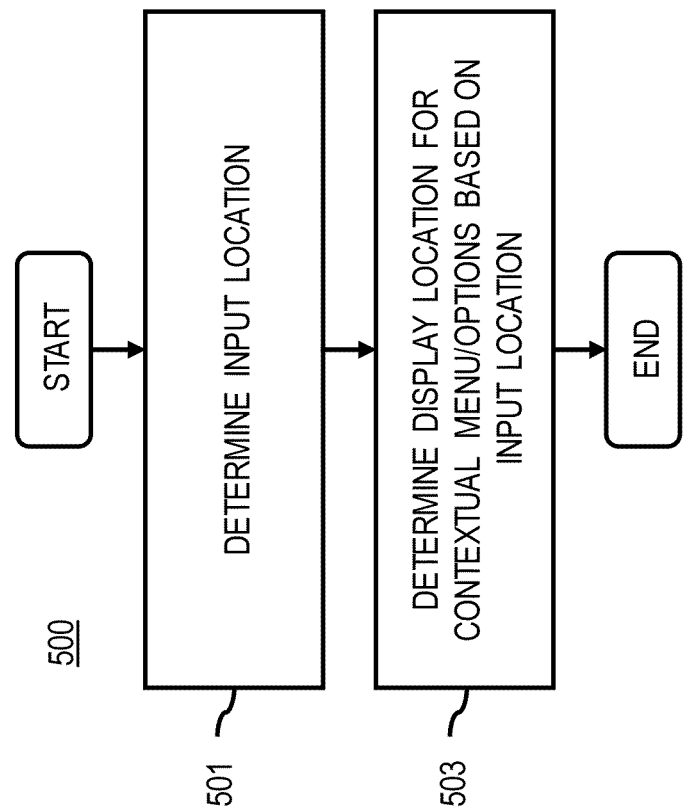
FIG. 5 is a flowchart of a process for presenting a contextual menu in a map display, according to one embodiment.

FIG. 5 is a flowchart of a process for presenting a contextual menu in a map display, according to one embodiment. In one embodiment, the contextual menu platform 115 and/or the contextual menu manager 117 perform all or a portion of the process 500 and are implemented in, for instance, a chip set including a processor and a memory as shown in FIG. 10. As such, the contextual menu platform 115 and/or the contextual menu manager 117 can provide means for accomplishing various parts of the process 500 as well as means for accomplishing other processes in conjunction with other components of the system 100.

In step 501, the contextual menu platform 115 determines at least one input location in the at least one map user interface at which the input is provided. In one embodiment, the contextual menu platform 115 can use the point in the map user interface where the user has specified a delineated route or geographical area as a location for initiating presentation of the contextual menu.

Accordingly, in step 503, the contextual menu platform 115 determines at least one display location for the at least one contextual menu, the one or more contextual menu options, or a combination thereof based, at least in part, on the at least one input location. It is contemplated that the platform 115 may use an input location as a reference point for positioning the contextual menu and/or the contextual menu options in the map user interface. For example, the input location can be used directly as a display location. In other examples, the contextual menu platform 115 can apply an offset to the input location and present the contextual menu at an offset location. In some embodiments, the platform 115 can dynamically determine an arrangement of the contextual menu options (e.g., circular arrangement, linear arrangement, arrangement in another shape, etc.) based on the input location and/or available display area at that input location.

Figure 6:
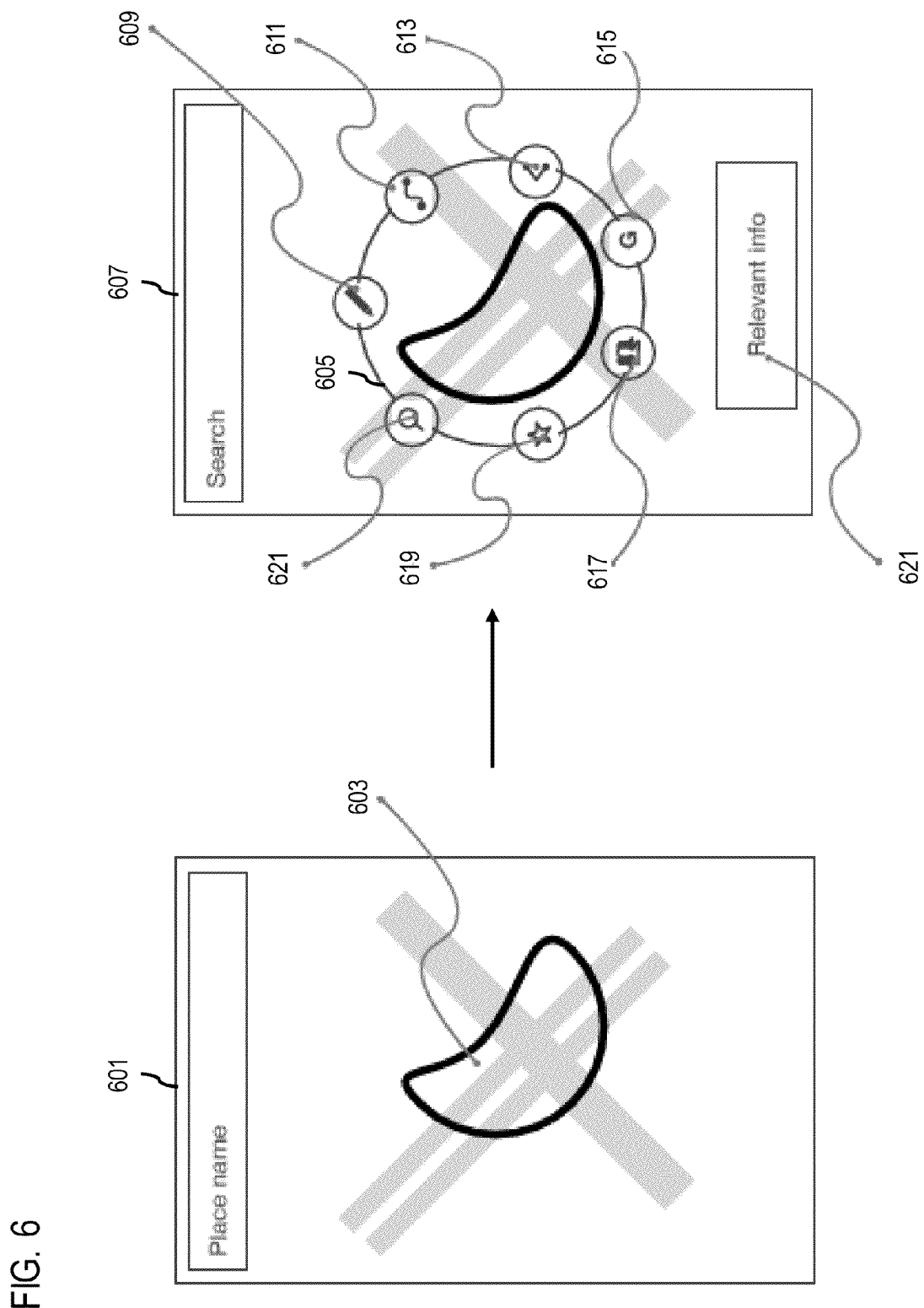
FIG. 6 is a diagram illustrating user interfaces for a delineation a geographical area to trigger a presentation of a contextual menu in a map display, according to one embodiment.

FIG. 6 is a diagram illustrating user interfaces for a delineation a geographical area to trigger a presentation of a contextual menu in a map display, according to one embodiment. As shown, a map user interface 601 enables a user to provide an input for delineating a geographical area of interesting by tracing that area over a map display. In this example, the user draws an area 603 to delineate a geographical area for generating a contextual menu.

On delineating the area, the contextual menu platform 115 identifies the area 603 (e.g., a venue or neighborhood), or instance, by querying the geographic database 111 or 113 for contextual information (e.g., demographics, points of interests, features, etc.) about the area 603 to generate a contextual menu 605 for presentation in map user interface 607. For example, the delineated area 603 (or route) may specify a venue or a neighborhood, and the contextual menu 605 will include menu options 609-621 that are most relevant to the delineated area 603.

In one embodiment, the contextual menu platform 115 determines the menu options 609-621 based on contextual information about the delineated area 603 (or route). As previously described, the contextual menu platform 115 can query or determine contextual information about the delineated area 603. The contextual menu platform 115 can process the contextual information (e.g., using rules, modeling, preconfigured associations, etc.) to select which menu options to present. In this way, the contextual menu platform 115 can surface only those options that are most likely to be relevant for a particular delineated area 603 or route, thereby customizing the specific set of menu options on an area-by-area or route-by-route basis, as delineated by a user. For example, if a query determines a number of a user's social networking contacts are presently located within or proximately to the delineated area 603 or route, the contextual menu platform 115 can be configured to select and present a social networking sharing option that may not otherwise be shown if the delineated area 603 did not include any of the user's social networking contacts. As another example, if the delineated area 603 or route currently is experiencing weather conditions that might give rise to a weather alert, the contextual menu platform 115 can present a weather application as one of the menu options that would otherwise not be presented if the delineated area 603 or route were not associated with such weather conditions.

In this example, the contextual menu platform 115 determines contextual information to indicate that the delineated area potentially is highly frequented by people in general and friends of the user in particular. Additionally, the delineated area includes many potential points of interest that may be of particular interest to the user based on the user profile and preferences. Accordingly, the contextual menu platform generates the contextual menu 605 to present options weighted towards social media and discovery services. Accordingly, the menu options 609-621 presented in the contextual menu 605 include an edit shape option 609, an itinerary option 611 for navigating area, a share option 613 for informing friends of the area, a third party share option 615 for creating meet-ups, a social graph option 617 for viewing friends in the area, a guide option 619 for exploring the area, and a discover option 619 for learning about the features or points of interest in the area.

In one embodiment, the discover option 619 (or another option menu not shown in the FIG. 6) can, in addition or alternatively, present applications relevant to the delineated area (or route). For example, the contextual menu platform 115 can query for the most popular applications that are used on devices within the delineated area or route. It is contemplated that the contextual menu platform 115 can use any algorithm or process (e.g., longest used applications, applications most recommended by other users, applications recommended by owners of points of interest in the delineated area or route, etc.) to determine what applications to present that are contextually relevant to the delineated area or route. As shown in FIG. 6, in one embodiment, the contextual menu platform 115 can also include additional relevant information 621 (e.g., distance to area, weather in the area, etc.) for display to the user.

Figure 7A:
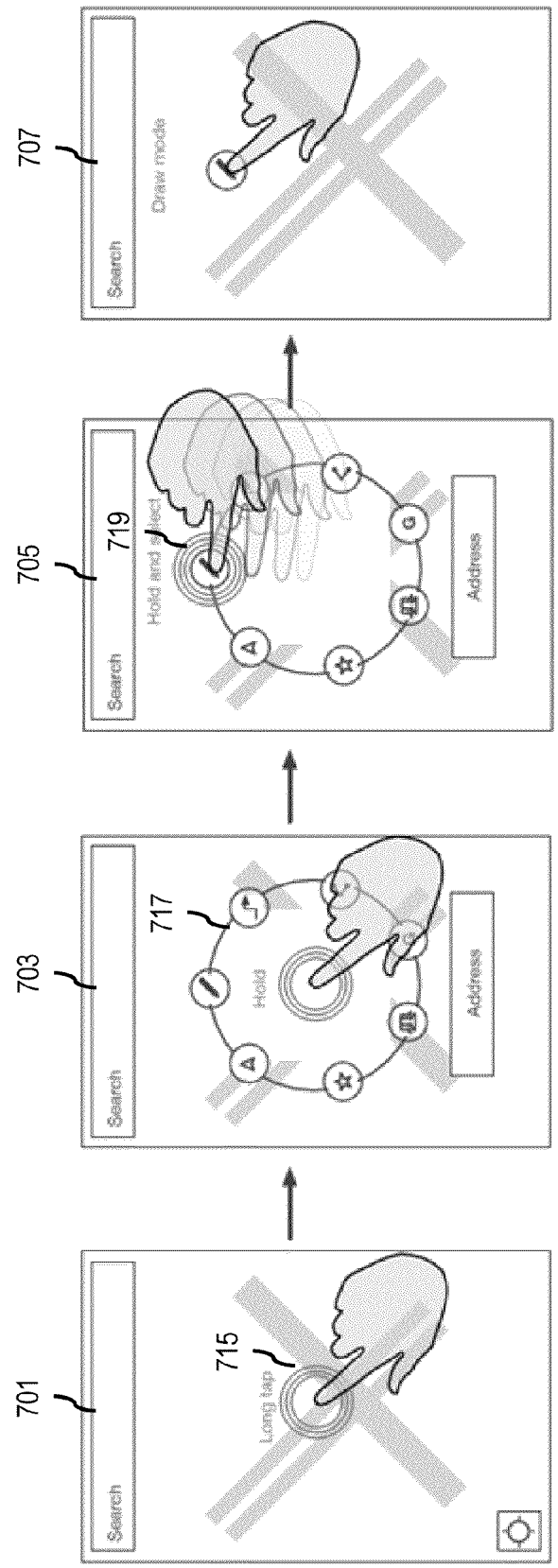
FIGS. 7A and 7B are diagrams illustrating user interface interactions for invoking a drawing input modality for a delineation a geographical area to trigger a presentation of a contextual menu in a map display, according to various embodiments.
Figure 7B:
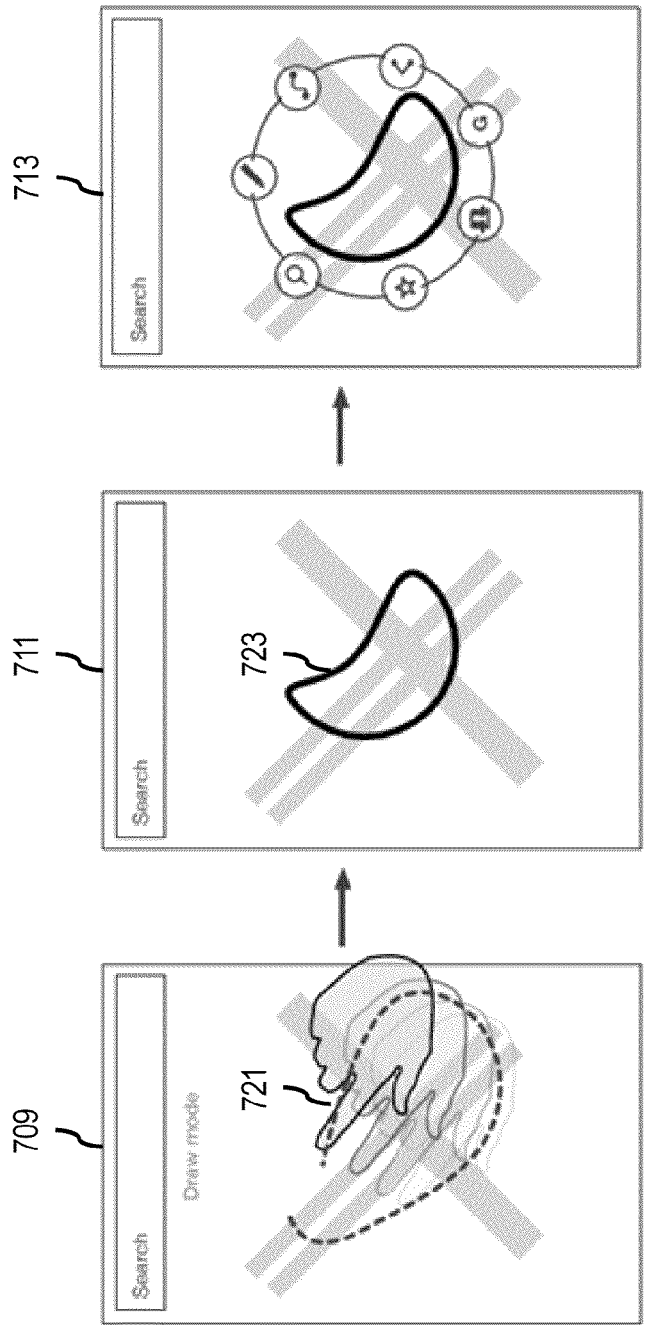

FIGS. 7A and 7B are diagrams illustrating user interface interactions for invoking a drawing input modality for a delineation a geographical area to trigger a presentation of a contextual menu in a map display, according to various embodiments. In one embodiment, the contextual menu platform 115 provides for different input interactions to invoke contextual menu functions in a map display. The example of FIGS. 7A and 7B illustrate a sequence of map user interfaces 701-713 for using a long tap input to initiate a drawing input modality for delineating route or geographical area to trigger a contextual menu. In map user interface 701, a user begins by initiating a long tap 715 at a location in map user interface 701. The user continues to hold the long tap 715 to trigger a display of a first contextual menu that is based on the point indicated by the long press 715 as shown in map user interface 703.

In map user interface 705, the user performs a hold a select action to invoke a draw mode option 719. As shown, in map user interface 707, the draw mode option 719 enables the user to begin drawing in the map user interface to delineate a geographical area. In map user interface 709 of FIG. 7B, the user performs a drawing motion 721 which results in a delineation of area 723 in map user interface 711. As described with respect to FIG. 6 above, the delineation of area 723 triggers a generation and presentation of a contextual menu 725 of map user interface 713 that includes menu options that are determined based on the contextual information associated with the area 723.

Figure 8A:
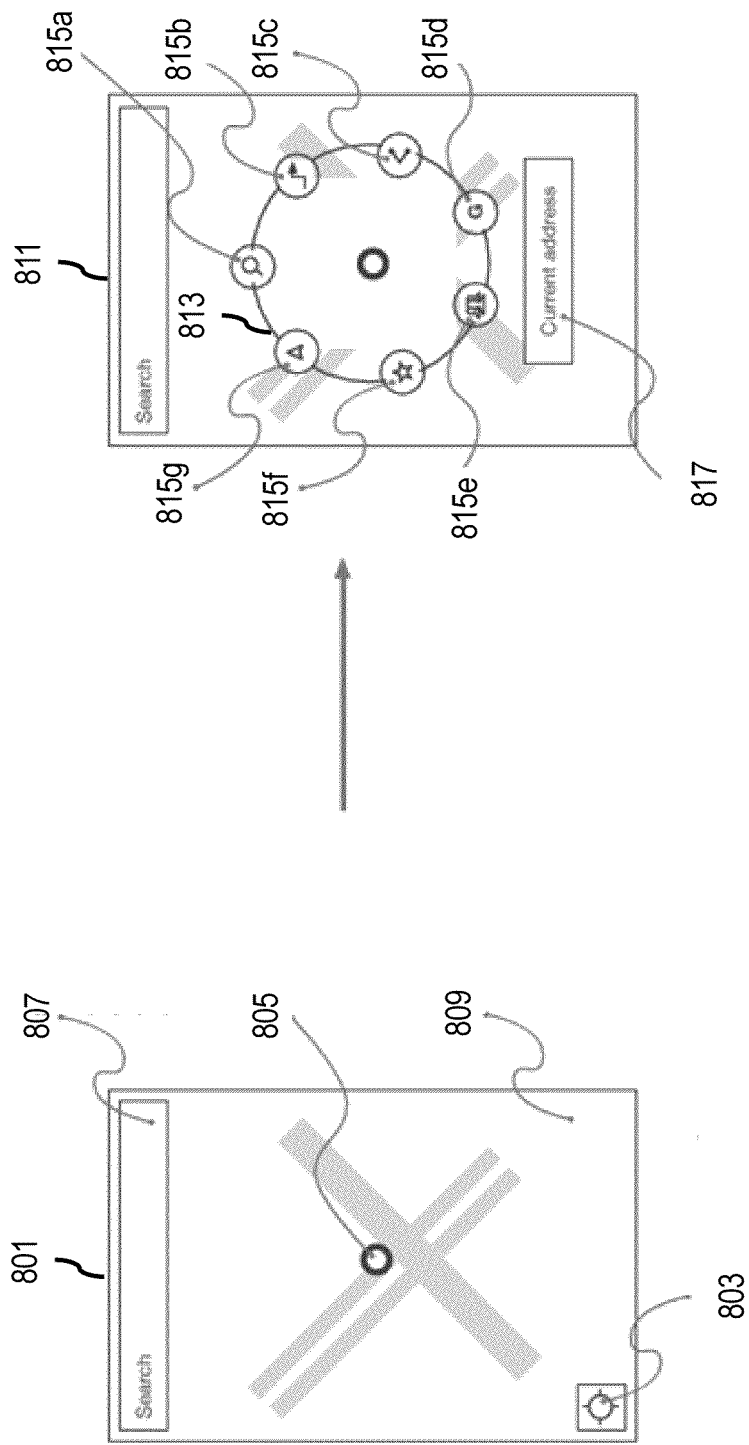
FIGS. 8A-8D are diagrams illustrating contextual menus that can be triggered based on respective contexts, according to various embodiments.

FIGS. 8A-8D are diagrams illustrating contextual menus that can be triggered based on respective contexts, according to various embodiments. FIG. 8A illustrates map user interface 801 with an example context in which a user is static. In this example, the user has selected tracking option 803 to enable the system 100 to track the user's location at location 805. In one embodiment, the tracking option 803 provides constant tracking of the user's position. In addition, the map user interface includes at two options (e.g., a search form 807 and an interactive map canvas 809) for setting a context. In one embodiment, setting a context comprises initiating an action of surfacing one or more objects on the map, e.g., through the search form 807 and a direct selection in the interactive map canvas 809. The act of surfacing one or more objects is part of the contextual information used by the contextual menu platform 115 to generate a contextual menu.

In one embodiment, the user triggers a contextual menu by, for instance, providing a tapping input on the location 805. As previously discussed, the tapping input can be used to either indicate a point location or can be used to automatically delineate a route or geographical area (e.g., a radius around the tap point). In this example, the tap automatically delineates a preconfigured area around the user's static location 805.

Based on this delineated area, the contextual menu platform 115 displays a map user interface 811 which presents a contextual menu 813 generated to include menu options 815a-815g that are most relevant to the user's static context. For example, menu option 815a is for discovering nearby features, menu option 815b is for obtaining directions from the location 805, menu option 815c is for sharing the location 805, menu option 815d is for third party sharing/meet-up, menu option 815e is for finding friends nearby, menu 815f is collecting or saving the location 805 in a personal list, and an option 815g for optimizing the presented map view based on the user's current context. In one embodiment, the map user interface also includes a display element 817 that reflects the user's current context by indicating the address associated with the user's current location 805.

Figure 8B:
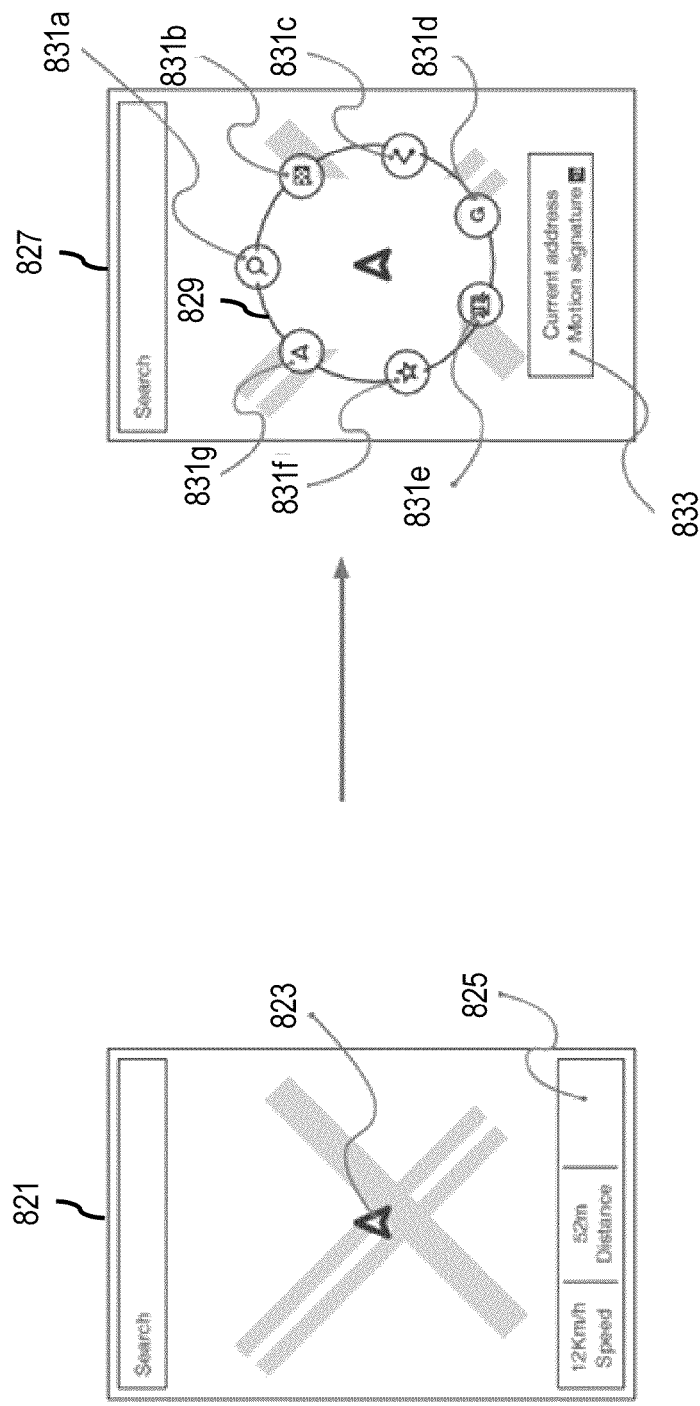

FIG. 8B illustrates map user interface 821 with an example context in which a user is dynamic but without a set destination or route. Because this user is dynamically moving, the map user interface 821 shows the user's location 823 with arrow icon, and provides a dashboard 825 for presenting movement information. As with FIG. 8B, the user triggers a contextual menu by, for instance, providing a tapping input on the location 823. As previously discussed, the tapping input can be used to either indicate a point location or can be used to automatically delineate a route or geographical area (e.g., a radius around the tap point). In this example, the tap automatically delineates a preconfigured area around the user's static location 823.

Based on this delineated area, the contextual menu platform 115 displays a map user interface 827 which presents a contextual menu 829 generated to include menu options 831a-831g that are most relevant to the user's dynamic context. For example, menu option 831a is for discovering nearby features, menu option 831b is for setting or predicting a destination based on the user's movement (e.g., compare with menu option 815b of FIG. 8A), menu option 831c is for sharing the location 823, menu option 831d is for third party sharing/meet-up, menu option 831e is for finding friends nearby, menu 831f is collecting or saving the location 823 in a personal list, and an option 831g for optimizing the presented map view based on the user's current context. In one embodiment, the map user interface also includes a display element 833 that reflects the user's current context by indicating the address associated with the user's current location 823 (updated as the user moves) as well as the user's motion signature to indicate the user's motion context (e.g., walking, running, riding a bike, taking a bus, driving a car, etc.).

Figure 8C:
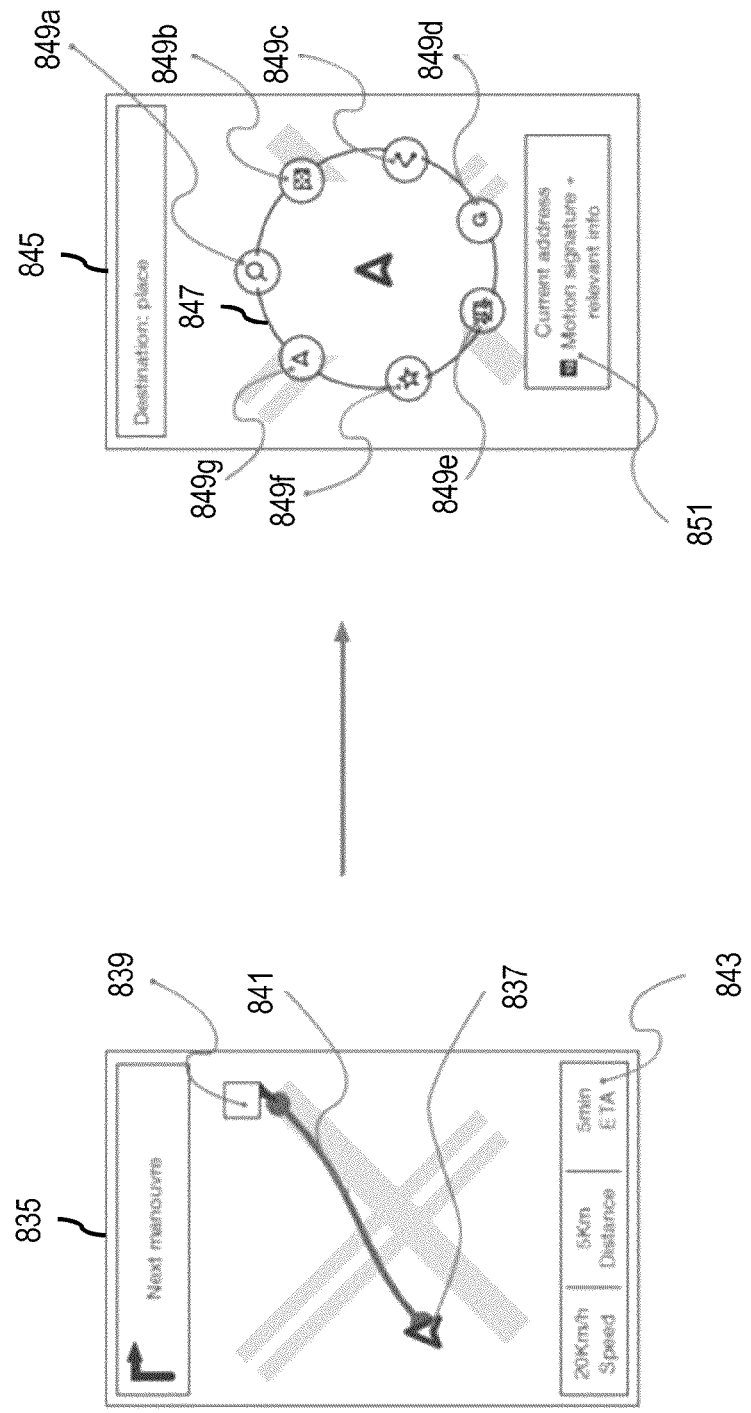

FIG. 8C illustrates map user interface 835 with an example context in which a user is dynamic with a set destination. Because this user is dynamically moving, the map user interface 835 shows the user's location 837 with arrow icon, the user destination 839 (e.g., a place with coordinates that has a unique ID that defines the place as a meaningful object—such as a house, building, business, landmark, etc.), and a route 841 to the destination 839. By way of example, the user's location 837 can be defined via coordinates (e.g., latitude/longitude), speed, and/or transport mode. In one embodiment, the map user interface 835 further provides a dashboard 843 for presenting movement information, including an estimated time of arrival (ETA) at the destination 839. In this example, the user triggers a contextual menu by, for instance, providing a tapping input on the route 841 to automatically delineate the route 841 from the user's location to the destination 839 for generating a contextual menu.

Based on this delineated route 841, the contextual menu platform 115 displays a map user interface 845 which presents a contextual menu 847 generated to include menu options 849a-849g that are most relevant to the user's dynamic context with a set route 841 and destination 839. For example, menu option 849a is for discovering en route features; menu option 849b is for modifying the destination 839; menu option 849c is for sharing the location 837, route 841, destination 839, and/or ETA information; menu option 849d is for third party sharing/meet-up; menu option 849e is for finding friends en route or at the destination 839; menu 849f is collecting or saving the location 837, the route 841, and/or the destination 839 in a personal list; and an option 849g for presenting a mobility graph and/or for suggesting a guidance method based on speed and usage. In one embodiment, the map user interface also includes a display element 851 that reflects the user's current context by indicating the address associated with the user's current location 837 (updated as the user moves), the user's motion signature to indicate the user's motion context (e.g., walking, running, riding a bike, taking a bus, driving a car, etc.), weather en route, weather at destination, etc.

Figure 8D:
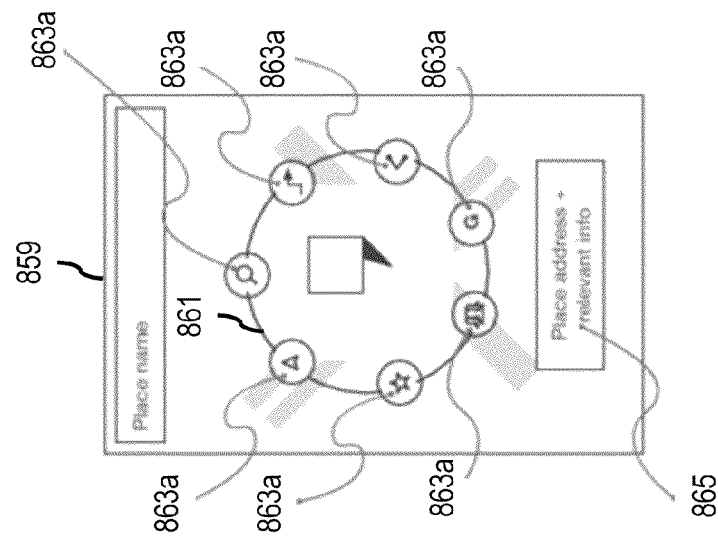
Figure 8D:
Figure 8D:
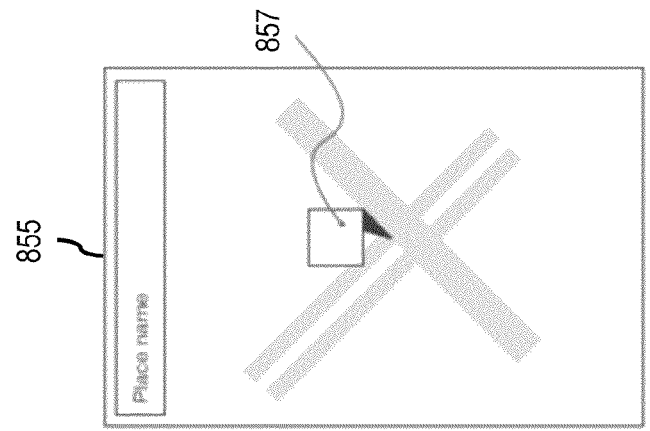

FIG. 8D illustrates map user interface 855 with an example context in which a user has set a context by searching for a place 857 and surfacing the place 857 in the map user interface 855 without enabling tracking Similar to the example of FIG. 8C, the place 857 is associated with coordinates that has a unique ID that defines the place as a meaningful object—such as a house, building, business, landmark, etc. Additionally, because tracking is not enabled (or because the user is displaying a search result distant from the user's current location), the user's location is not displayed on the map user interface 855.

In this example, the user triggers a contextual menu by, for instance, providing a tapping input on the place 857. As previously discussed, the tapping input can be used to either indicate a point location or can be used to automatically delineate a route or geographical area (e.g., a radius around the tap point). In this case, the tap automatically delineates a preconfigured area around the place 857.

Based on the geographical area around the lace 857 delineated by the tapping input, the contextual menu platform 115 displays a map user interface 859 which presents a contextual menu 861 generated to include menu options 863a-863g that are most relevant to the delineated area around the place 857. For example, menu option 863a is for discovering nearby features; menu option 863b is for obtaining directions to the place 857; menu option 863c is for sharing the place 857; menu option 863d is for third party sharing/meet-up; menu option 863e is for finding friends at, near, or going to the place 857; menu 863f is collecting or saving the place 857 in a personal list; and an option 863g for suggesting a guidance method to the place 857. In one embodiment, the map user interface also includes a display element 865 that reflects the place 857's and/or the user's current context by indicating the address associated with the place 857, additional relevant information (e.g., current address of the user, distance to the place 857, weather at the place 857, etc.), and/or the like.

The processes described herein for providing a contextual menu in a map display may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
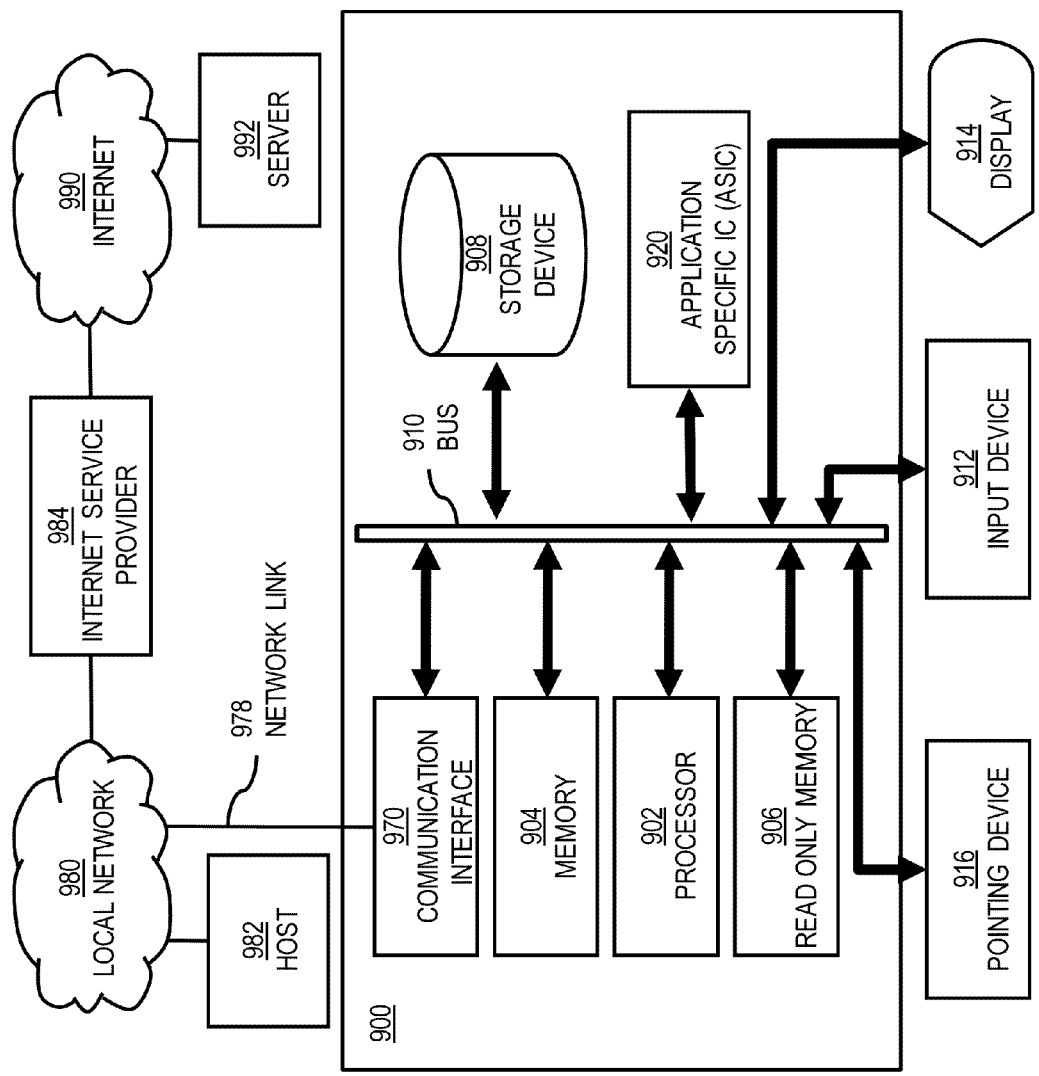
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide a contextual menu in a map display as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing a contextual menu in a map display.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing a contextual menu in a map display. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing a contextual menu in a map display. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing a contextual menu in a map display, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 119 for providing a contextual menu in a map display to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide a contextual menu in a map display as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing a contextual menu in a map display.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide a contextual menu in a map display. The memory 1005 also stores the data associated with or generated by the execution of the inventive steps.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing a contextual menu in a map display. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing a contextual menu in a map display. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide a contextual menu in a map display. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a user input that delineates at least one route, at least one geographical area, or a combination thereof in a map user interface of a device;
    identifying contextual information associated with mapping data of the at least one route, the at least one geographical area, or a combination thereof;
    determining one or more contextual menu options based, at least in part, on the contextual information; and
    initiating a presentation of at least one contextual menu of the one or more contextual menu options in the map user interface.

2. A method of claim 1, wherein the user input is drawn over the map user interface, and the at least one route, the at least one geographical area, or a combination thereof is delineated using at least one input modality, and wherein the at least one input modality includes, at least in part, a drawing input modality, a gesture input modality, a voice input modality, a gaze tracking input modality, a text input modality, or a combination thereof.

3. A method of claim 2, further comprising:
    processing the input to determine at least one input characteristic associated with the at least one input modality used to delineate the at least one route, the at least one geographical area, or a combination thereof;
    wherein the contextual information, the one or more contextual menu options, or a combination thereof are further based, at least in part, on the at least one input characteristic.

4. A method of claim 3, wherein the at least one input characteristic includes, at least in part, a user input speed, a user input shape, or a combination thereof.

5. A method of claim 1, further comprising:
    determining that the user input specifies at least one user input direction, at least one user input vector heading, or a combination thereof,
    wherein the contextual information, the one or more contextual menu options, or a combination thereof are further based on the at least one user input direction, the at least one user input vector heading, or a combination thereof.

6. A method of claim 1, further comprising:
    determining at least one input location in the map user interface at which the input is provided; and
    determining at least one display location for the at least one contextual menu, the one or more contextual menu options, or a combination thereof based, at least in part, on the at least one input location.

7. A method of claim 1, wherein the input is at least one tap input, the method further comprising:
    processing the at least one tap input to initiate a determination, a recommendation, or a combination thereof of the at least one route, the at least one geographical area, or a combination thereof.

8. A method of claim 1, further comprising:
    initiating a correlation of the user input to one or more map features in the map user interface; and
    determining the at least one route, the at least one geographical area, or a combination thereof based, at least in part, on the correlation.

9. A method of claim 1, further comprising:
    processing the contextual information to determine one or more default parameter values for the one or more contextual menu options, wherein the context information includes neighborhood information, weather information, proximity information, type of area information, demographics information, distance information, available points of interest information, or a combination thereof; and
    initiating a presentation of the one or more default parameters values in the at least one contextual menu.

10. A method of claim 1, wherein the input further specifies at least a portion of the contextual information.

11. An apparatus comprising:
    at least one processor; and
    at least one memory including computer program code for one or more programs,
    the at least one memory and the computer program code configured to, with the at least one processor, cause the apparatus to perform at least the following,
        receive a user input that delineates at least one route, at least one geographical area, or a combination thereof in a map user interface of a device;
        identify contextual information associated with mapping data of the at least one route, the at least one geographical area, or a combination thereof;
        determine one or more contextual menu options based, at least in part, on the contextual information; and
        initiate a presentation of at least one contextual menu of the one or more contextual menu options in the map user interface.

12. An apparatus of claim 11, wherein the at least one route, the at least one geographical area, or a combination thereof is delineated using at least one input modality, and wherein the at least one input modality includes, at least in part, a drawing input modality, a gesture input modality, a voice input modality, a gaze tracking input modality, a text input modality, or a combination thereof.

13. An apparatus of claim 12, wherein the apparatus is further caused to:
  process the input to determine at least one input characteristic associated with the at least one input modality used to delineate the at least one route, the at least one geographical area, or a combination thereof;
  wherein the contextual information, the one or more contextual menu options, or a combination thereof are further based, at least in part, on the at least one input characteristic.

14. An apparatus of claim 13, wherein the at least one input characteristic includes, at least in part, a user input speed, a user input shape, or a combination thereof.

15. An apparatus of claim 11, wherein the apparatus is further caused to:
  determine that the user input specifies at least one user input direction, at least one user input vector heading, or a combination thereof,
  wherein the contextual information, the one or more contextual menu options, or a combination thereof are further based on the at least one user input direction, the at least one user input vector heading, or a combination thereof.

16. An apparatus of claim 11, wherein the apparatus is further caused to:
  determine at least one input location in the map user interface at which the input is provided; and
  determining at least one display location for the at least one contextual menu, the one or more contextual menu options, or a combination thereof based, at least in part, on the at least one input location.

17. An apparatus of claim 11, wherein the input is at least one tap input, and wherein the apparatus is further caused to:
  process the at least one tap input to initiate a determination, a recommendation, or a combination thereof of the at least one route, the at least one geographical area, or a combination thereof.

18. A computer program product including one or more sequences of one or more instructions which, when executed by one or more processors, cause an apparatus to at least perform:
  receiving a user input that delineates at least one route, at least one geographical area, or a combination thereof in a map user interface of a device;
  identifying contextual information associated with mapping data of the at least one route, the at least one geographical area, or a combination thereof;
  determining one or more contextual menu options based, at least in part, on the contextual information; and
  initiating a presentation of at least one contextual menu of the one or more contextual menu options in the map user interface.

19. A computer program product of claim 18, wherein the at least one route, the at least one geographical area, or a combination thereof is delineated using at least one input modality, and wherein the at least one input modality includes, at least in part, a drawing input modality, a gesture input modality, a voice input modality, a gaze tracking input modality, a text input modality, or a combination thereof.

20. A computer program product of claim 19, wherein the apparatus is further caused to perform:
  processing the input to determine at least one input characteristic associated with the at least one input modality used to delineate the at least one route, the at least one geographical area, or a combination thereof;
  wherein the contextual information, the one or more contextual menu options, or a combination thereof are further based, at least in part, on the at least one input characteristic.

* * * * *